United States Patent [19]

Andrews et al.

[11] Patent Number: 5,101,271
[45] Date of Patent: Mar. 31, 1992

[54] IMAGE RESTORATION AND FAULTY SENSOR DETECTION AND COMPENSATION SYSTEM AND PROCESS

[75] Inventors: Roland L. Andrews, Altadena; Lloyd L. Lewins, Marina Del Rey, both of Calif.

[73] Assignee: Hughes Aircraft Company, Los Angeles, Calif.

[21] Appl. No.: 502,345

[22] Filed: Mar. 30, 1990

[51] Int. Cl.$^5$ ............................................. H04N 7/18
[52] U.S. Cl. ............................... 358/113; 358/213.17; 250/332; 250/252.1
[58] Field of Search .................. 358/113, 139, 213.16, 358/213.17; 356/51; 250/332, 252.1

[56] References Cited

U.S. PATENT DOCUMENTS

| | | | |
|---|---|---|---|
| 4,423,437 | 12/1983 | Beck et al. | 358/113 |
| 4,517,460 | 5/1985 | Meulenbrugge et al. | 250/252.1 |
| 4,583,187 | 4/1986 | Stoub | 250/252.1 X |
| 4,590,520 | 5/1986 | Frame et al. | 358/213.17 X |
| 4,602,291 | 7/1986 | Temes | 358/213.17 X |
| 4,697,280 | 9/1987 | Zarnstorff et al. | 250/252.1 X |
| 4,700,708 | 10/1987 | New, Jr. et al. | 250/252.1 A X |
| 4,701,784 | 10/1987 | Matsuoka et al. | 358/213.17 |
| 4,712,010 | 12/1987 | Alm | 358/113 X |
| 4,819,752 | 4/1989 | Zelin | 250/252.1 A X |
| 4,835,606 | 5/1989 | Peck | 358/113 |
| 4,858,013 | 8/1989 | Matsuda | 358/213.17 |
| 4,866,615 | 9/1989 | Ichihara | 250/252.1 R X |
| 4,910,598 | 3/1990 | Itakura et al. | 358/213.16 X |
| 4,933,555 | 6/1990 | Smith | 250/252.1 A X |
| 4,948,964 | 8/1990 | Gohlke | 250/252.1 X |

Primary Examiner—Victor R. Kostak
Attorney, Agent, or Firm—Leonard A. Alkov; Wanda K. Denson-Low

[57] ABSTRACT

A scene-based image restoration system, method and apparatus calculates a plurality of restoration signals to be combined with a plurality of input signals to produce resultant signals that are substantially equal during a desired time interval. These scene-based image restoration systems and methods can use DC offset signals as scene restoration signals. To enhance results, faulty sensors in the system are detected, and the input signals from them compensated to produce better video images from the signals.

8 Claims, 3 Drawing Sheets

IMAGE RESTORATION AND FAULTY SENSOR DETECTION AND COMPENSATION SYSTEM AND PROCESS

BACKGROUND OF THE INVENTION

1. Field of the Invention

This invention relates to a system and process for improving the quality of video images generated by a Forward Looking Infrared (FLIR) sensor array. The invention encompasses a scene-based image restoration system and a sensor gain compensation system based upon information derived from scene data, as well as a system and process for identifying, and compensating for, faulty sensors.

2. Description of Related Art

Until now, image restoration systems have commonly used dc restoration to generate video images based upon information received from sensors. In the case of FLIR sensors, a DC restoration system would provide good ground/sky distinction, but is lacking in local area contrast. While the DC restored image is suitable for a pilot following "Nap of the Earth" flying techniques, the video image lacks the definition required to detect targets against a uniform background, such as the sky or the sea.

Previously, differing gains of sensors within the FLIR array were compensated for in a calibration procedure that used hardware to adjust the gains of the front-end amplifiers for the various sensors. However, high or low gain channels went undetected, no method to optimize the distribution of gains was employed, and the system was not usable during calibration since the output was disrupted.

Previously, cross coupling to effectively remove faulty sensors from the FLIR array required changing the wiring harness to wire good sensors in the place of faulty ones. Once a technician made the changes in the wiring harness, the harness was no longer interchangeable with the harness of another FLIR unit.

SUMMARY OF THE INVENTION

This invention relates to a scene-based image restoration and sensor compensation system, including "Method of Comparisons" evaluation to identify faulty sensors and an electronic cross coupling remedy. The system includes means for evaluating data derived from signals produced by a plurality of sensors, means for determining the appropriate output and means for generating the desired output signals.

In preferred embodiments, the input signals are received from an array of Forward Looking Infrared (FLIR) sensors. The array consists of 160 vertically aligned sensors that each generate signals used to produce horizontal lines of a video display as the sensor array scans the desired scene. In preferred embodiments, one complete scan by the array includes a scan of a constant temperature source (contained within the FLIR assembly) in addition to the scan of the desired scene. The scan of the constant temperature source provides a uniform stimulus to enable the system to identify variations in the outputs of different sensors within the array.

The amplitudes of the analog input signals resulting from the scan of the scene and constant temperature source for each sensor channel are converted to digital representations and stored in memory devices. An average amplitude is calculated from a desired sampling of the stored data for each sensor channel. In preferred embodiments, separate averages are determined for the desired samplings of data from the scene scan and the constant temperature source scan. The averages calculated for each sensor channel are then used to determine the desired output signals for that particular sensor channel. For scene-based restoration, the computed average of the scene scan sampling is designated $\overline{EOARE_n}$, for each channel, n.

Once determined, the desired output signals are stored until needed. In preferred embodiments, the signals are stored in memory devices. At the desired times, the output signals for each channel are retrieved from memory.

In a preferred embodiment for scene-based restoration of a video image, the desired output signal for each sensor channel is a DC offset signal calculated for that sensor channel. In the DC restore mode, the DC offset signal is calculated to ensure that the outputs of all of the sensors as they scan the uniform temperature source are the same. In scene-based restoration, the DC offset is calculated to ensure that the average outputs of each sensor during the field of view are the same. Once determined, the DC offset signals are then added to the subsequent input signals from the corresponding sensor channel of the sensor array. The digital values of the DC offset signals are represented by the following:

$$DCR_{n\ new} = DCR_{n\ old} + k(CL - \overline{EOARE_n})$$

where:

$DCR_{n\ new}$ is the digital value of the scene-based restoration DC offset signal for sensor channel n;

$DCR_{n\ old}$ is the $DCR_n$ value from the previous calculation;

k is a constant defined by the system;

$\underline{CL}$ is the desired video signal output level; and $\overline{EOARE_n}$ is the calculated average amplitude of the sampled scene data for sensor channel n.

In preferred embodiments, new DCR values are calculated every fourth scan.

In another preferred embodiment, the Method of Comparisons uses the data received from the sensors to compensate for the differing gains between sensors, and to identify faulty sensors within the array. The FLIR sensor is set up to view a uniform cold object over its whole field of view. The input signals for each sensor channel are DC restored and then passed through a variable gain amplifier for that channel. The gain of each amplifier is initially set to the same value. At that point, the analog signals are received, converted to digital values and stored, and the average amplitudes of the desired samplings are calculated. In addition to calculating the average amplitude for the signals from each sensor channel, an average is also calculated for the totality of sensor channels.

In the Method of Comparisons preferred embodiment, the average of each sensor channel is compared with the average of the totality of sensor channels to identify those sensors for which:

$$|EOARE_n - CL| < \left| \frac{EOARE - CL}{2} \right|$$

where:

$\overline{EOARE_n}$ is the calculated average amplitude of the sampled constant temperature source data for sensor channel n;

CL is the level at which the video is clamped for DC restoration; and $\overline{EOARE}$ is the calculated average amplitude for the totality of sensor channels.

Those sensors which meet the test are dead or low gain sensors and are designated as faulty. The data from faulty sensors are not included in further calculations. New averages are calculated for the remaining sensor channels and for the totality of the remaining sensor channels. A new sampling, taken from new input signals, is used for computing the new averages. These averages are then used to calculate an initial estimate of the various output signals.

In preferred embodiments of the Method of Comparisons, the desired output is an amplifier gain calculated for each sensor channel. Each amplifier gain is calculated as a digital value, but is converted to analog when output to its respective variable gain amplifier. The initial estimate for the amplifier gain for any sensor channel, n, is:

$$ARE_{n\,new} = (1 + ARE_{n\,old}) k_n - 1$$

where:

$ARE_{n\ new}$ is the newly calculated gain for sensor channel n;

$ARE_{n\ old}$ is the initial gain for sensor channel n; and $$k_n = \frac{\overline{EOARE_n} - CL}{\overline{EOARE} - CL}$$

An iterative process is then performed, in preferred embodiments, in an effort to optimize the distribution of amplifier gains by balancing as many sensor channels as possible. An ideally balanced system would provide a uniform image with minimal banding over the entire video image when viewing a constant temperature In preferred embodiments, the first step in the iterative process is to compare the $\overline{EOARE_n}$ for each active sensor channel with $\overline{EOARE}$, the average of all of the active sensor channels, having previously eliminated the dead and low gain sensors. If the $\overline{EOARE_n}$ is less than $\overline{EOARE}$, one least significant bit is subtracted from $ARE_n$; if the $\overline{EOARE_n}$ is greater than $\overline{EOARE}$, one least significant bit is added to $ARE_n$. Where $\overline{EOARE_n}$ is substantially equal to $\overline{EOARE}$, no change is made. Once each active sensor channel has been compared, the process is repeated. The process continues until each of the AREs has reached one of three conditions. First, the $ARE_n$ has not changed its value because the $\overline{EOARE_n}$ for that active sensor channel is substantially equal to $\overline{EOARE}$. Second, the $ARE_n$ has reached its upper limit, or third, the $ARE_n$ has reached its lower limit. AREs that have reached their upper or lower limits are said to be saturated. At the completion of this process, a balanced set of AREs has been determined for that particular $\overline{EOARE}$.

In preferred embodiments, the $\overline{EOARE}$ is now adjusted and a new balanced set of AREs is determined. This step is included in an effort to find the optimal balanced set of AREs. The optimal balanced set of AREs may be found by adjusting the $\overline{EOARE}$ so as to remove as many AREs as possible from the saturation limits. If the balanced set has no AREs that are saturated at either the upper or lower limits, then that balanced set is in fact the optimal balanced set and no further calculations are required. In addition, if the number of AREs saturated at the upper limit is equal to the number of AREs saturated at the lower limit, then, in preferred embodiments, this is the optimal balanced set of AREs. However, if there exist AREs saturated at the upper limit or AREs at the lower limit, or an unequal number of AREs at both limits, the process continues.

The next step in the process begins by adjusting the $\overline{EOARE}$ up by one least significant bit if a greater number of sensor channels are saturated at the upper limit; the $\overline{EOARE}$ is adjusted down by one least significant bit if a greater number of sensor channels are saturated at the lower limit. With the new $\overline{EOARE}$, the previously described iterative process is repeated and a new balanced set of AREs is determined. If an analysis of the new AREs indicates that no more are in saturation, then those ARE values comprise the optimal balanced set. Likewise, if an equal number of AREs are saturated at the upper and lower limits, then again, those ARE values are the optimal balanced set. However, if there still exist AREs saturated at the upper limit or AREs at the lower limit, or an unequal number of AREs at both limits, the process continues by increasing or decreasing the $\overline{EOARE}$ by one least significant bit. Again, the $\overline{EOARE}$ is adjusted up by one least significant bit if a greater number of sensor channels are saturated at the upper limit and adjusted down by one least significant bit if a greater number of sensor channels are saturated at the lower limit.

The process is repeated until no AREs are in saturation or until an equal number of AREs are saturated at the upper and lower limits, in which case the optimal balanced set has been reached. In addition, if the new $\overline{EOARE}$, having been increased by one least significant bit, results in a balanced set containing an increased number of AREs saturated at the lower limit, then the previously determined balanced set of ARE values is the optimal set. Likewise, if the new $\overline{EOARE}$, having been decreased by one least significant bit, results in a balanced set containing an increased number of AREs saturated at the upper limit, then the previously determined balanced set of ARE values is the optimal set. In preferred embodiments, the previously determined ARE values are stored in memory.

In preferred embodiments, if, after five changes of the $\overline{EOARE}$, no change occurs in the number of AREs saturated at the upper or lower limits, then those ARE values represent the optimal balanced set.

From the optimal set of ARE values, the sensor channels corresponding to the ARE values that could not be brought out of saturation are low or high gain, and therefore out of specification. In preferred embodiments, those sensor channels are designated as faulty and will not be used in generating the video image.

Once the faulty sensors have been identified, electronic cross coupling is used to exclude the input signals from those sensors in generating the video image. In preferred embodiments, the information is stored in memory and incorporated into the system during the interpolation process. In the interpolation process, electronic cross coupling enables the system to choose the input signals received from the good sensors and to reject the signals from the sensors that are not within the specifications.

The interpolation process begins with reading the data from a desired number of sensor channels from memory. Information obtained from the Method of Comparisons evaluations determines which sensor channel, or combination of sensor channels, will be used to generate the video output. Once chosen, the data are converted from digital to analog and displayed.

In preferred embodiments, the sensor channel data are read out of memory in groups of four sensor channels. Through the interpolation process, each group generates six lines of video. The signal controlling each line of video consists of a four bit code stored in random access memory. The four bit code designates whether that particular line of video output will consist of any single line of sensor channel data or not, as well as whether those data will be used alone or as an average of a plurality of sensor channel data. Having distinguished the good sensors from the bad sensors, a microprocessor, in preferred embodiments, can alter the four bit codes in order to substitute signals from bad sensors with those signals from adjacent good sensors. This constitutes electronic cross coupling.

In preferred embodiments, it is possible to manipulate the microprocessor's choice of the four bit code through external inputs, enabling the operator to remove undesired sensor channel data. The four bit codes are stored in non-volatile memory, making them available each time power is restored.

DESCRIPTION OF THE PREFERRED EMBODIMENT

Figure 1:
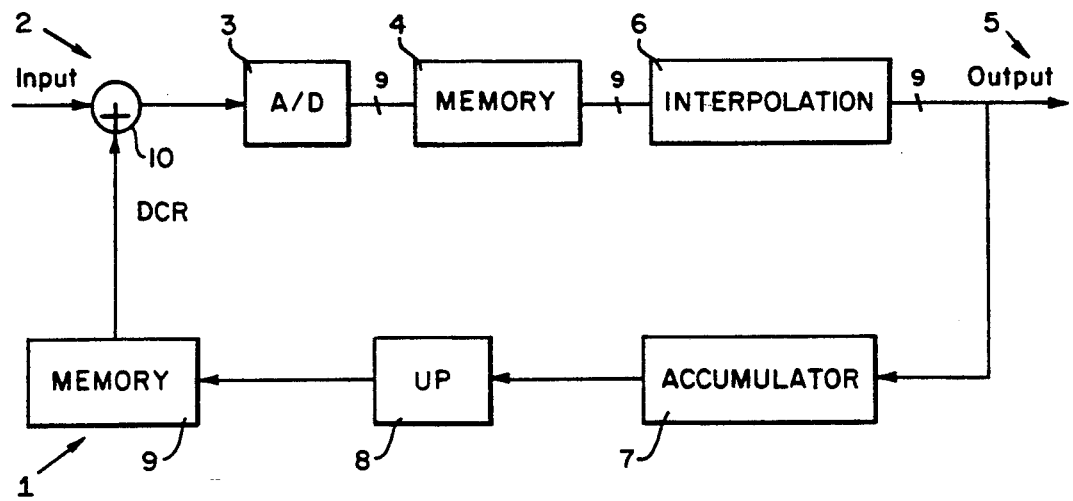
FIG. 1 shows a schematic, block diagram illustrating a preferred embodiment of the scene-based image restoration.

FIG. 1 shows, in block diagram form, image restoration system 1. The signals received from a Forward Looking Infrared (FLIR) sensor array are provided to the input of the system 2. The amplitudes of the signals are converted from analog to digital via the A/D converter 3. These data are then stored in memory 4 and provided to the output 5 as required. The system includes means for interpolating the data 6 to produce the desired output 5.

The accumulator 7 receives the outputs for the various sensor channels and calculates the averages for each sensor channel. The microprocessor 8 calculates the outputs for each sensor channel and stores the values in memory 9. At the desired time, the output signals are introduced into the system via an adder 10.

Figure 2:
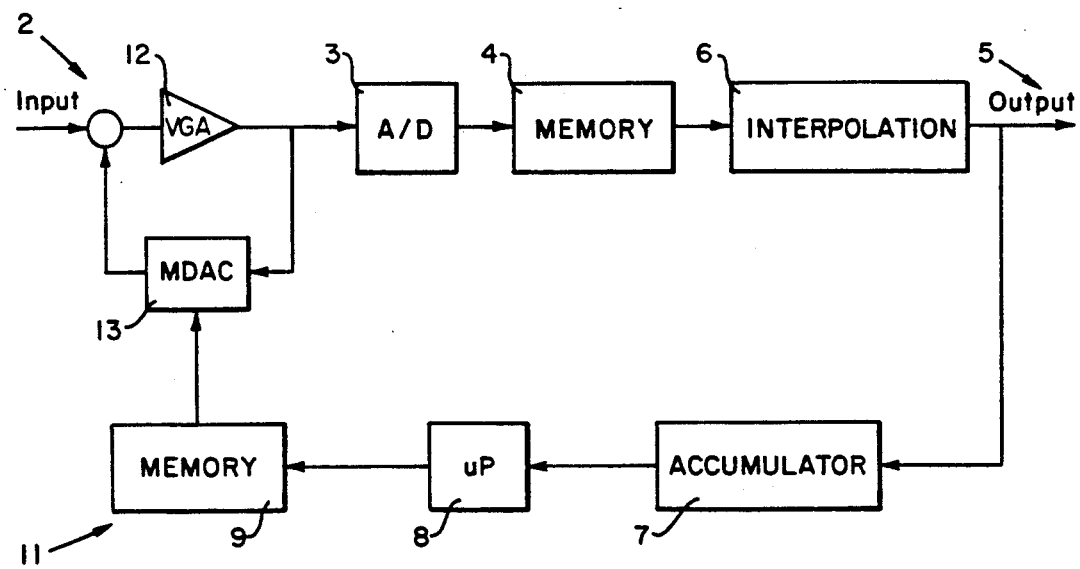
FIG. 2 shows a schematic, block diagram illustrating a preferred embodiment of the Method of Comparisons.

FIG. 2 shows, in block diagram form, the Method of Comparisons 11. The signals received from the FLIR sensor array are provided to the input of the system 2. After passing through the variable gain amplifier 12, the signals are converted from analog to digital via the A/D converter 3. These data are then stored in memory 4 and provided to the output 5 as required. The system includes means for interpolating the data 6 to produce the desired output 5.

The accumulator 7 receives the outputs for the various sensor channels and calculates the averages for each sensor channel. The microprocessor 8 calculates the digital amplifier gains for each sensor channel and stores the values in memory 9. At the desired time, the digital amplifier gains are converted to the corresponding analog amplifier gains via the MDAC 13 and introduced into the system.

Figure 3:
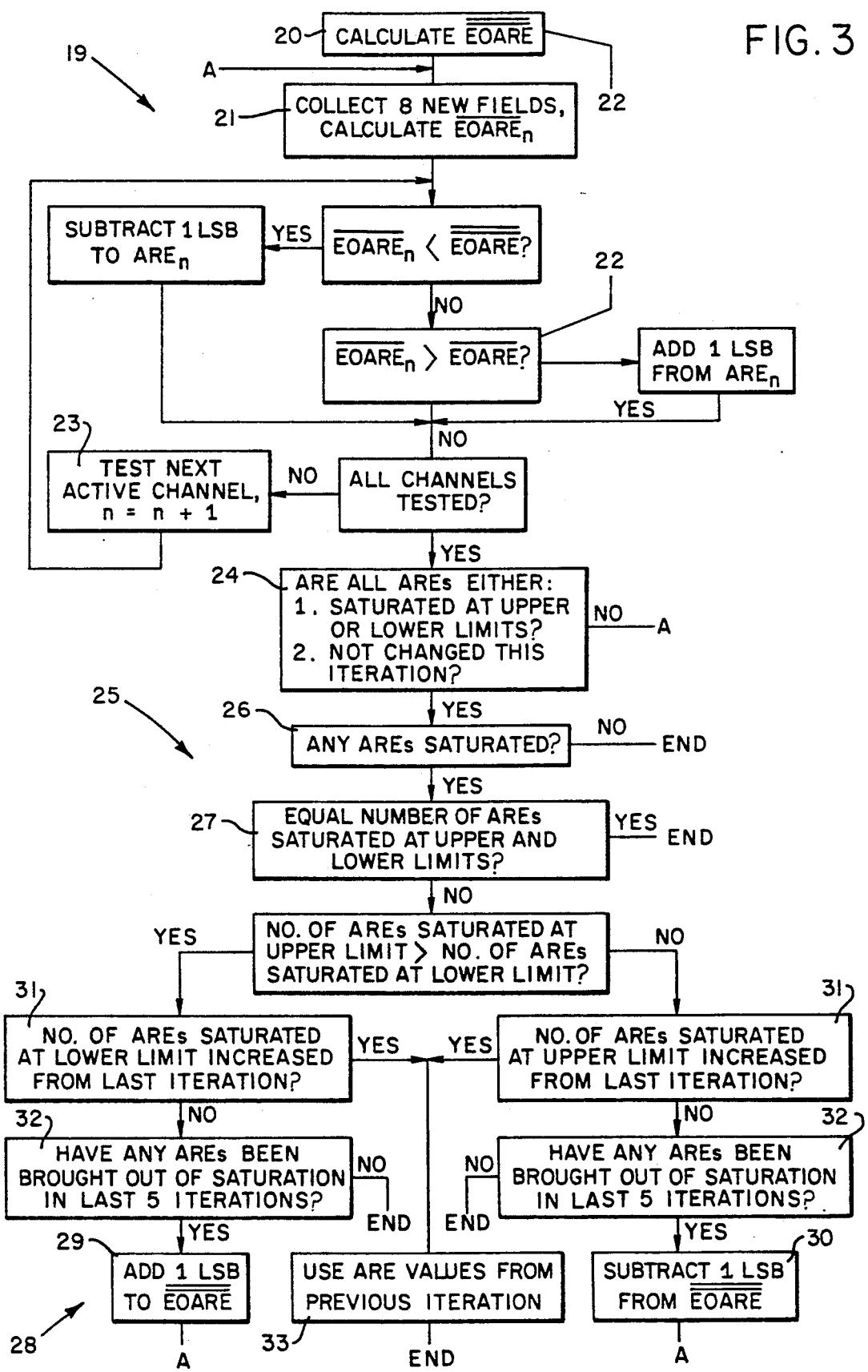
FIG. 3 shows a flow diagram illustrating the iterative process used in determining the optimal set of balanced amplifier gains.

FIG. 3 shows a flow diagram illustrating the iterative process used to determine the optimal set of balanced amplifier gains. The first part of the process, 19, produces a balanced set of amplifier gains for the sensors in the sensor array that are within specifications. Having eliminated the out of specification sensors, an average output for all sensors of the array, $\overline{EOARE}$, is calculated, 20. An average output for each of these sensors is then calculated by collecting eight fields of input signals from the sensor, 21. Each sensor average is then compared to the average of all of the sensors and the gain for that sensor is adjusted up or down in an effort to balance all of the sensors, 22. After the averages for all of the sensors have been compared, 23, the process is repeated until the gains for each sensor channel have settled at the desired value or saturated at the upper or lower limits, 24. At this stage, a balanced set of amplifier gains has been calculated.

The next part of the process, 25, determines whether or not that balanced set of amplifier gains is the optimal set. If none of the amplifier gains are saturated at the upper or lower limits, 26, then the set is considered to be optimal. If an equal number of amplifier gains are saturated at the upper and lower limits, 27, that too is an optimal set. If neither case applies, the $\overline{EOARE}$ is adjusted slightly in an effort to bring as many amplifier gains out of saturation as possible, 28. Where the number of amplifier gains saturated at the upper limit is greater than the number of amplifier gains saturated at the lower limit, one least significant bit is added to the value of $\overline{EOARE}$, 29. Where the number of amplifier gains saturated at the lower limit is greater than the number of amplifier gains saturated at the upper limit, one least significant bit is subtracted from the value of $\overline{EOARE}$, 30. The first part of the process, 19, is then repeated to find a new balanced set of amplifier gains.

The process of adjusting the $\overline{EOARE}$ and calculating a new balanced set of amplifier gains is continued until no more amplifier gains can be brought out of saturation, or there has been no change in the number of saturated amplifier gains for the last five changes in the $\overline{EOARE}$, 32, or until there is an increase in the number of amplifier gains saturated at the opposite limit, 31. When this occurs, the amplifier gains from the previous balanced set are used, 33.

Figure 4:
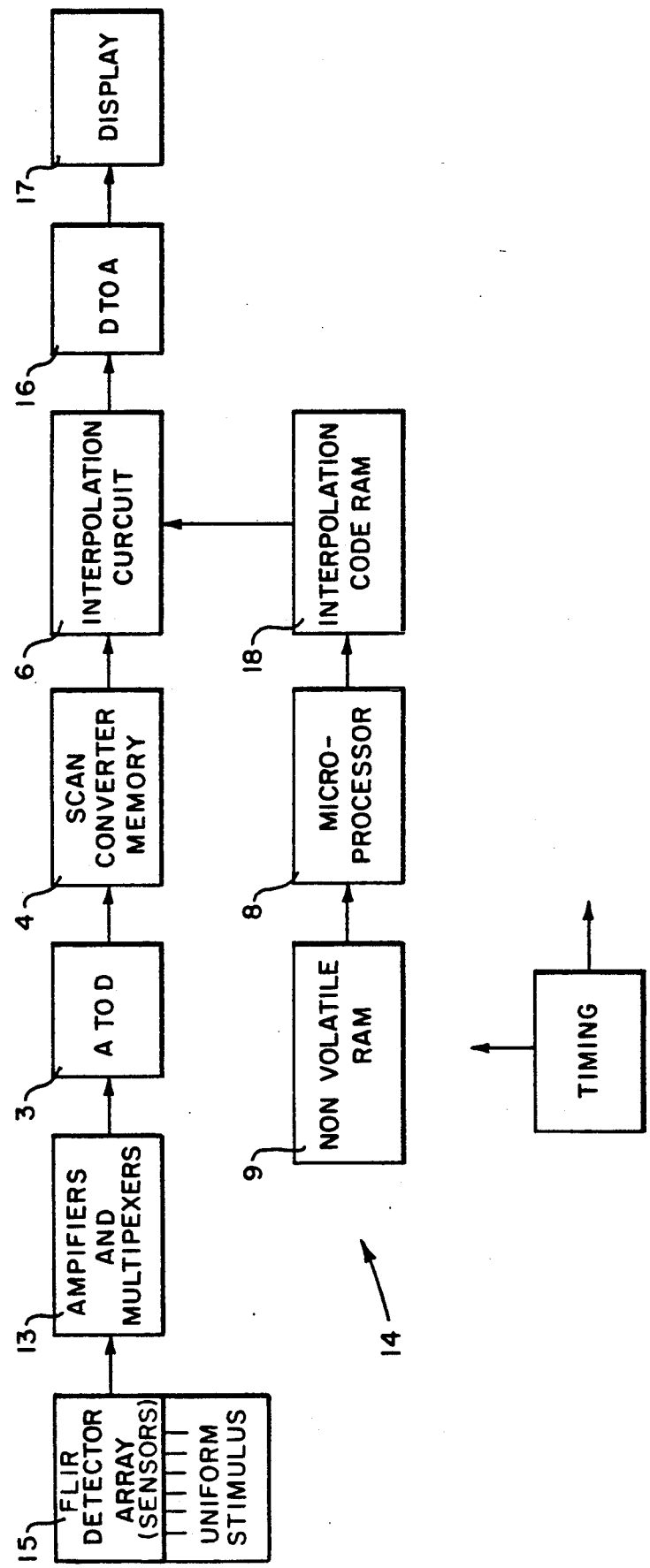
FIG. 4 shows a schematic, block diagram illustrating a preferred embodiment of the electronic cross coupling.

FIG. 4 shows, in block diagram form, electronic cross coupling 14. The signals received from the FLIR sensor array 15 are provided to the amplifiers and multiplexers 13. The amplitudes of the signals are converted from analog to digital via the A/D converter 3. These data are then stored in memory 4. After interpolation 6, the data are converted from digital back to analog 16 to generate the video display 17.

The microprocessor 8 uses stored data in non-volatile memory 9, which identify the faulty sensors, to determine the desired four bit code. The microprocessor 8 provides the desired four bit code to the interpolation circuit 6 via the interpolation code memory 18.

While preferred embodiments of the present invention have been described and illustrated, various modifications will be apparent to those skilled in the art and it is intended to include all such modifications and variations within the scope of the appended claims.

What is claimed is:

1. A faulty sensor detection and compensation method, comprising the steps of:
   evaluating a plurality of input signals from a plurality of sensors exposed simultaneously to a uniform stimulus with the following steps:
   (i) computing an average amplitude of input signals for each sensor from a plurality of input signals generated by each sensor scanning a uniform stimulus,
   (ii) computing an average amplitude for a plurality of sensors,
   (iii) comparing the average amplitude of each sensor to the average amplitude of said plurality of sensors, and
   (iv) identifying sensors whose average amplitude is outside of a desired range, said desired range being related to said average amplitude of said plurality of sensors;
   calculating a plurality compensation signals based upon said input signals from said sensor with the following steps:
   (i) estimating the values of said compensation signals, said estimated compensation signals being applied to said signal responsive means so as to vary said input signals,
   (ii) sampling a plurality of said varied input signals from said plurality of sensors to calculate said plurality of average amplitudes of said varied input signals,
   (iii) comparing said average amplitudes for a plurality of sensors with a combined average amplitude of a plurality of sensors within said desired range, and
   (iv) repeating said estimating, sampling and comparing steps until a desired set of compensation signals are calculated; and
   applying said compensation signals to signal responsive means linked to said input signals so as to vary said input signals, such that a maximum number of said plurality of sensors will provide varied input signals of substantially the same amplitude.

2. A faulty sensor detection and compensation method, comprising the steps of:
   evaluating a plurality of input signals from a plurality of sensors exposed simultaneously to a uniform stimulus with the following steps:
   (i) computing an average amplitude of input signals for each sensor from a plurality of input signals generated by each sensor scanning a uniform stimulus,
   (ii) computing an average amplitude for a plurality of sensors,
   (iii) comparing the average amplitude of each sensor to the average amplitude of said plurality of sensors, and
   (iv) identifying sensors whose average amplitude is outside of a desired range, said desired range being related to said average amplitude of said plurality of sensors;
   calculating a plurality compensation signals based upon said input signals from said sensors with the following steps:
   (i) estimating the values of said compensation signals, said estimated compensation signals being applied to said signal responsive means so as to vary said input signals,
   (ii) sampling a plurality of said varied input signals from said plurality of sensors to calculate said plurality of average amplitudes of said varied input signals,
   (iii) comparing said average amplitudes for a plurality of sensors with a combined average amplitude of a plurality of sensors within said desired range, and
   (iv) repeating said estimating, sampling and comparing steps until a desired set of compensation signals are calculated; and
   applying said compensation signals to signal selection means, said signal selection means being linked to said input signals, producing a plurality of output signals from a desired selection of said input signals.

3. A faulty sensor detection and compensation method, comprising the steps of:
   evaluating a plurality of input signals from a plurality of sensors exposed simultaneously to a uniform stimulus with the following steps:
   (i) computing an average amplitude of input signals for each sensor from a plurality of input signals generated by each sensor scanning a uniform stimulus,
   (ii) computing an average amplitude for a plurality of sensors,
   (iii) comparing the average amplitude of each sensor to the average amplitude of said plurality of sensors, and
   (iv) identifying sensors whose average amplitude is outside of a desired range, said desired range being related to said average amplitude of said plurality of sensors;
   calculating a plurality compensation signals based upon said input signals from said sensors with the following steps:
   (i) estimating the values of said compensation signals, said estimated compensation signals being applied to said signal responsive means so as to vary said input signals,
   (ii) sampling a plurality of said varied input signals from said plurality of sensors to calculate said plurality of average amplitudes of said varied input signals,
   (iii) comparing said average amplitudes for a plurality of sensors with a combined average amplitude of a plurality of sensors within said desired range, and
   (iv) repeating said estimating, sampling and comparing steps until a desired set of compensation signals are calculated; and
   applying a first group of said compensation signals to signal responsive means linked to said input signals so as to vary said input signals, such that a maximum number of said plurality of sensors will provide varied input signals of substantially the same amplitude; and
   applying a second group of said compensation signals to signal selection means, said signal selection means being linked to said varied input signals, producing a plurality of output signals from a desired selection of said varied input signals.

4. A faulty sensor detection and compensation system, comprising:

means for evaluating a plurality of input signals from a plurality of sensors, each of each sensors simultaneously scanning a uniform stimulus with the following steps:
  (i) means for computing an average amplitude of input signals for each sensor from a plurality of input signals generated by each sensor scanning said uniform stimulus,
  (ii) means for computing an average amplitude for a plurality of sensors,
  (iii) means for comparing the average amplitude of each sensor to the average amplitude of said plurality of sensors, and
  (iv) means for identifying sensors whose average amplitude is outside of a desired range, said desired range being related to said average amplitude of said plurality of sensors;
means for calculating a plurality of compensation signals based upon said input signals from said sensors with the following steps:
  (i) means for estimating the values of said compensation signals, said estimated compensation signals being applied to said signal responsive means so as to vary said input signals,
  (ii) means for sampling a plurality of said varied input signals from said plurality of sensors to calculate said plurality of average amplitudes of said varied input signals,
  (iii) means for comparing said average amplitudes for a plurality of sensors with a combined average amplitude of a plurality of sensors within said desired range, and
  (iv) means for repeating said estimating, sampling and comparing steps until a desired set of compensation signals has been calculated; and
means for applying said compensation signals to signal responsive means linked to said input signals so as to vary said input signals, such that a maximum number of said plurality of sensors will provide varied input signals of substantially the same amplitude.

5. A faulty sensor detection and compensation system comprising:
means for evaluating a plurality of input signals from a plurality of sensors, each of said sensors simultaneously scanning a uniform stimulus with the following steps:
  (i) means for estimating the values of said compensation signals, said estimated compensation signals being applied to said signal responsive means so as to vary said input signals,
  (i) means for computing an average amplitude of input signals for each sensor from a plurality of input signals generated by each sensor scanning said uniform stimulus,
  (ii) means for computing an average amplitude for a plurality of sensors,
  (iii) means for comparing the average amplitude of each sensor to the average amplitude of said plurality of sensors, and
  (iv) means for identifying sensors whose average amplitude is outside of a desired range, said desired range being related to said average amplitude of said plurality of sensors;
means for calculating a plurality of compensation signals based upon said input signals from said sensors with the following steps:
  (i) means for estimating the values of said compensation signals, said estimated compensation signals being applied to said signal responsive means so as to vary said input signals,
  (ii) means for sampling a plurality of said varied input signals from said plurality of sensors to calculate said plurality of average amplitudes of said varied input signals,
  (iii) means for comparing said average amplitudes for a plurality of sensors with a combined average amplitude of a plurality of sensors within said desired range, and
  (iv) means for repeating said estimating, sampling and comparing steps until a desired set of compensation signals has been calculated; and
means for calculating a plurality of compensation signals based upon said input signals from said sensors with the following steps:
  (i) means for estimating the values of said compensation signals, said estimated compensation signals being applied to said signal responsive means so as to vary said input signals,
  (ii) means for sampling a plurality of said varied input signals from said plurality of sensors to calculate said plurality of average amplitudes of said varied input signals,
  (iii) means for comparing said average amplitudes for a plurality of sensors with a combined average amplitude of a plurality of sensors within said desired range, and
  (iv) means for repeating said estimating, sampling and comparing steps until a desired set of compensation signals has been calculated; and
means for applying said compensation signals to signal selection means, said signal selection means being liked to said input signals, producing a plurality of output signals from a desired selection of said input signals.

6. A faulty sensor detection and compensation system, comprising:
means for evaluating a plurality of input signals from a plurality of sensors, each of said sensors simultaneously scanning a uniform stimulus with the following steps:
  (i) means for computing an average amplitude of input signals for each sensor from a plurality of input signals generated by each sensor scanning said uniform stimulus,
  (ii) means for computing an average amplitude for a plurality of sensors,
  (iii) means for comparing the average amplitude of each sensor to the average amplitude of said plurality of sensors, and
  (iv) means for identifying sensors whose average amplitude is outside of a desired range, said desired range being related to said average amplitude of said plurality of sensors;
means for calculating a plurality of compensation signals based upon said input signals from said sensor with the following steps:
  (i) means for estimating the values of said compensation signals, said estimated compensation signals being applied to said signal responsive means so as to vary said input signals,
  (ii) means for sampling a plurality of said varied input signals from said plurality of sensors to calculate said plurality of average amplitudes of said varied input signals, (iii) means for comparing said average amplitudes for a plurality of sensors with a combined average amplitude of a plurality of sensors within said desired range, and (iv) means for repeating said estimating, sampling and comparing steps until a desired set of compensation signals has been calculated; and means for applying a first group of said compensation signals to signal responsive means linked to said input signals so as to vary said input signals, such that a maximum number of said plurality of sensors will provide varied input signals of substantially the same amplitude; and means for applying a second group of said compensation signals to signal selection means, said signal selection means being linked to said varied input signals, producing a plurality of output signals from a desired selection of said varied input signals.

7. The system of claim 6 comprising:

a FLIR sensor array, said sensor array providing said input signals and containing a plurality of sensors to be evaluated and compensated for;

an analog to digital converter for extracting said data by providing digital representations of amplitudes of said input signals from said sensor array during a scan of a uniform source, said uniform source being contained in the housing of said FLIR sensor array;

an accumulator for calculating the average values of said desired samplings of said amplitudes;

a microprocessor to relate said average values for said samplings to produce a plurality of amplifier gain signals, said amplifier gain signals being said first group of said compensation signals supplying signal responsive means, said signal responsive means being variable gain amplifiers through which said input signals flow; and at least one memory device for storing said average values and said amplifier gain signals.

8. The system of claim 6 comprising:

a microprocessor coupled to signal selective means, said microprocessor generating said second group of compensation signals, said second group of compensation signals causing said signal selection means linked to said input signals to produce an output based upon said desired selection of said input signals; and at least one memory device for storing said compensation signals.

* * * * *